Sept. 2, 1958 E. Y. ROBERTS 2,850,187
TAILGATE MECHANISM FOR TRUCKS
Filed Jan. 17, 1956 4 Sheets-Sheet 1
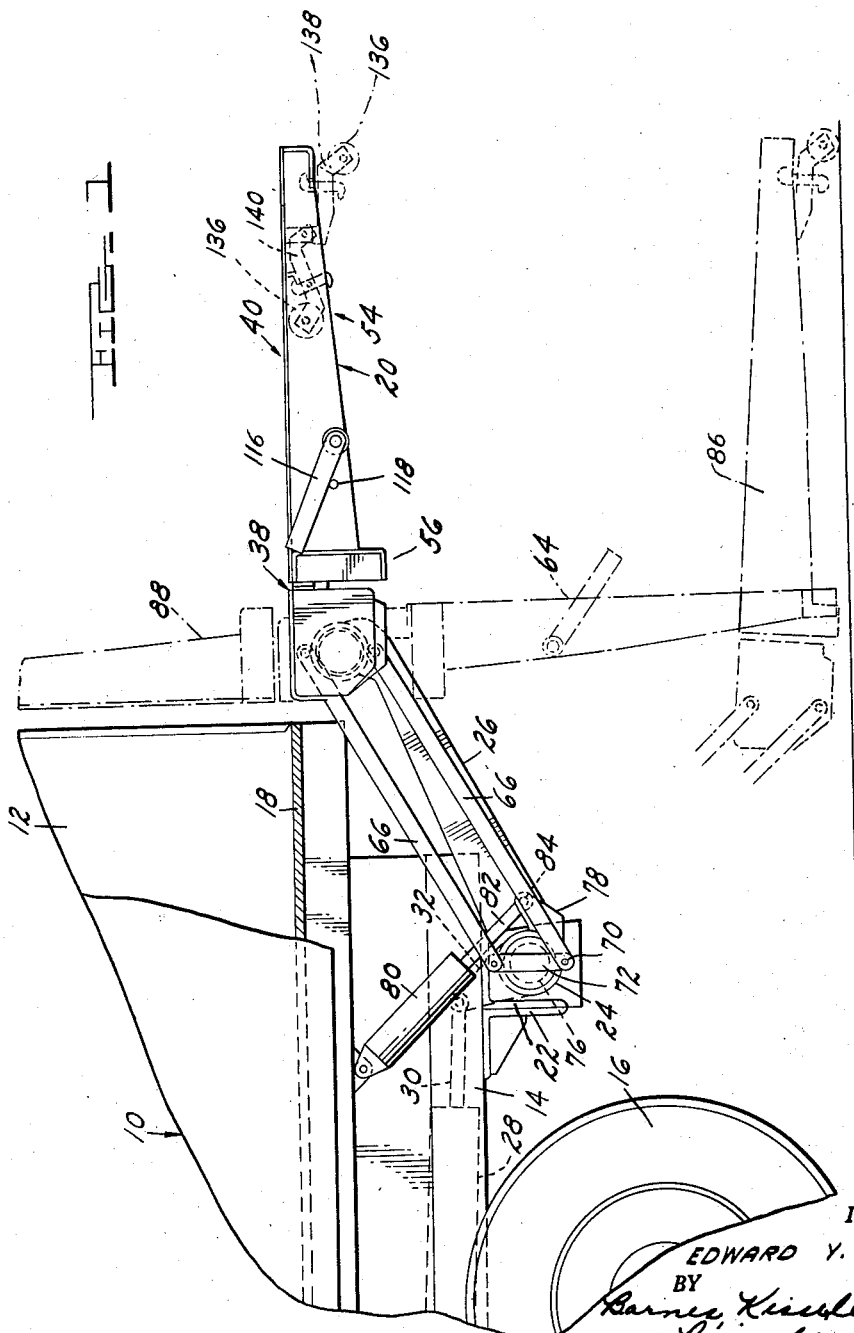
INVENTOR.
EDWARD Y. ROBERTS
BY
ATTORNEYS Sept. 2, 1958     E. Y. ROBERTS     2,850,187
TAILGATE MECHANISM FOR TRUCKS
Filed Jan. 17, 1956     4 Sheets-Sheet 2
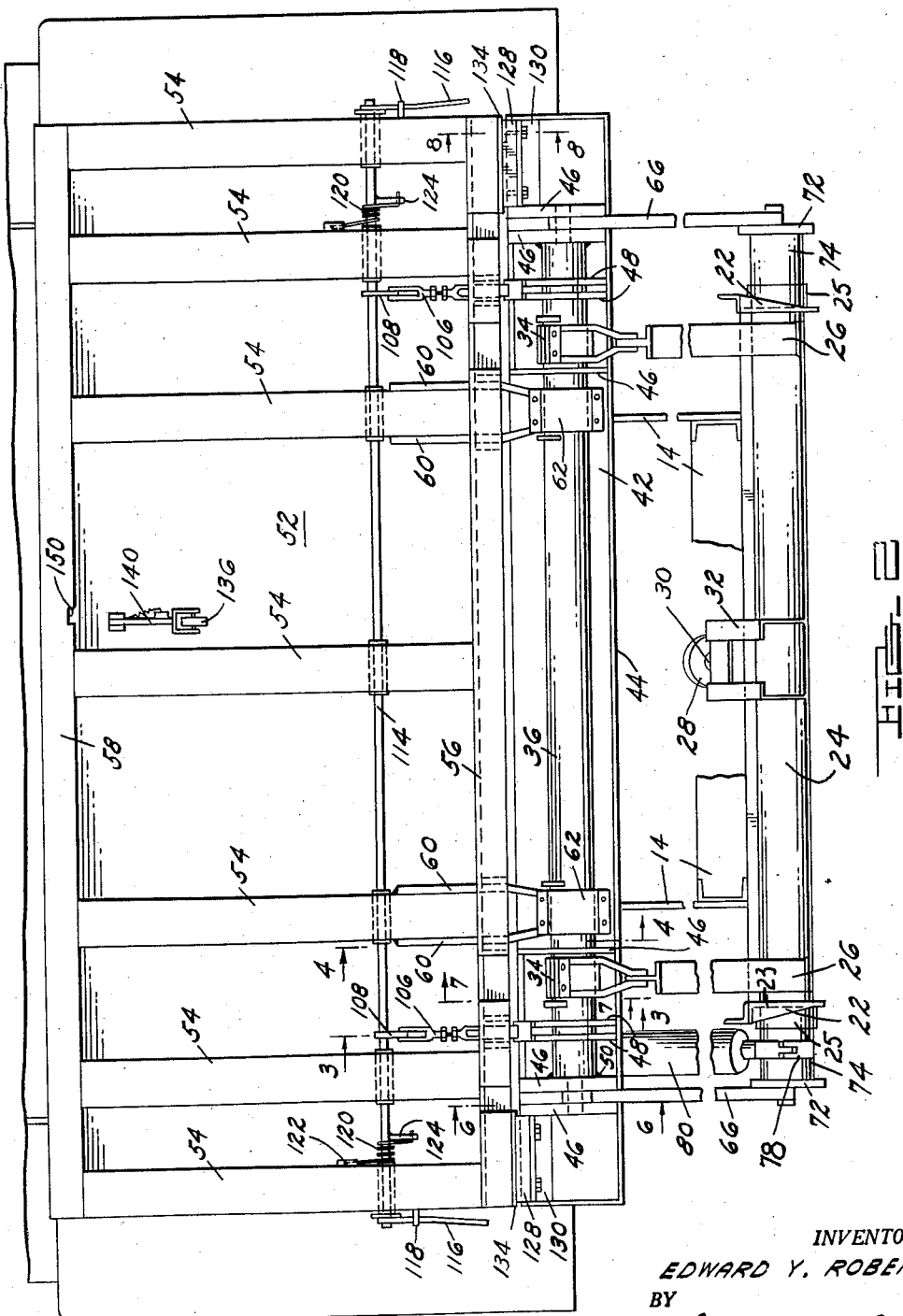
INVENTOR.
EDWARD Y. ROBERTS
BY
ATTORNEYS

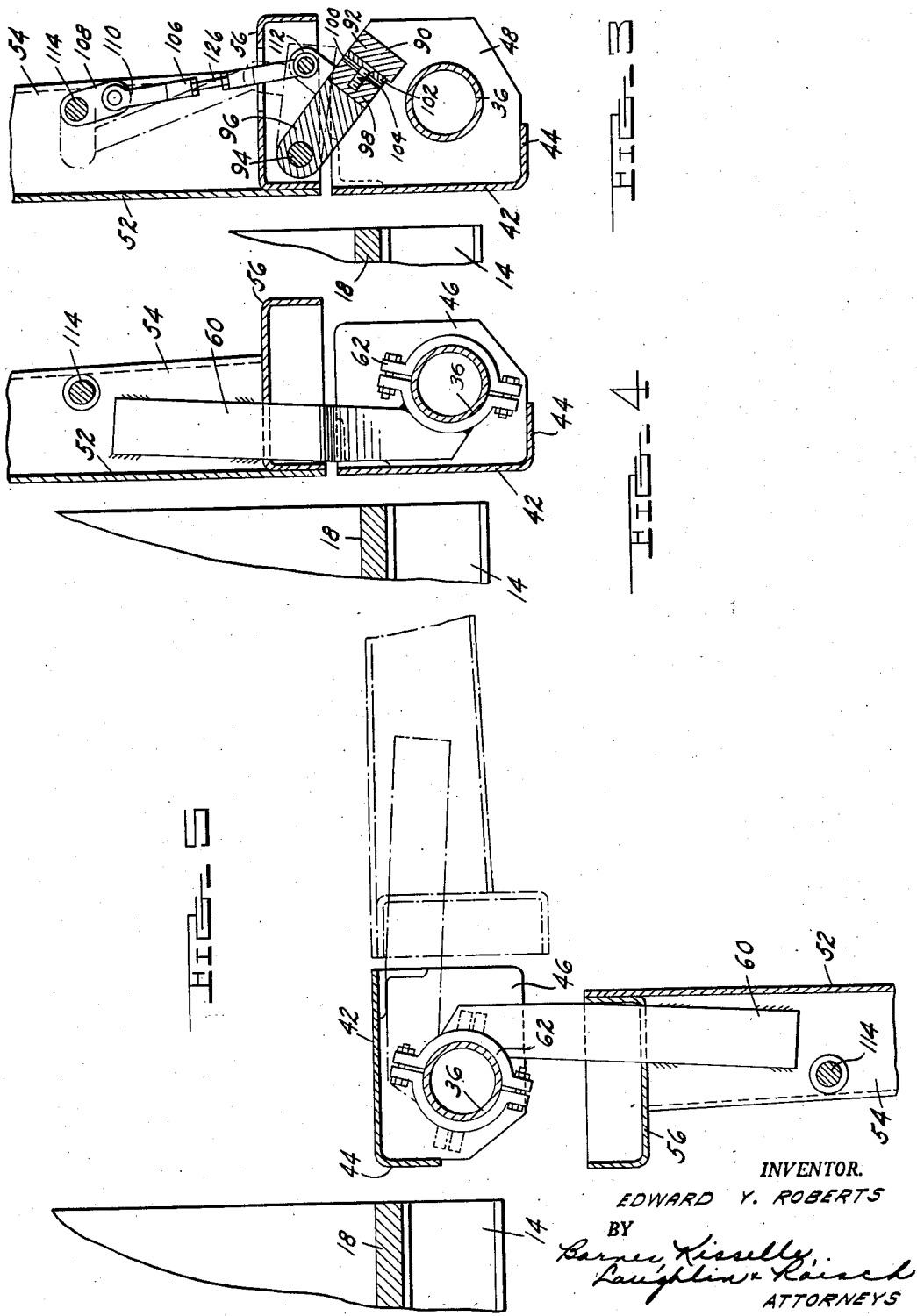

Sept. 2, 1958  E. Y. ROBERTS  2,850,187
TAILGATE MECHANISM FOR TRUCKS
Filed Jan. 17, 1956  4 Sheets-Sheet 4
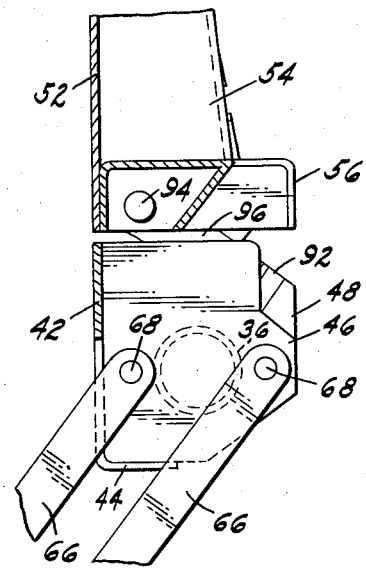
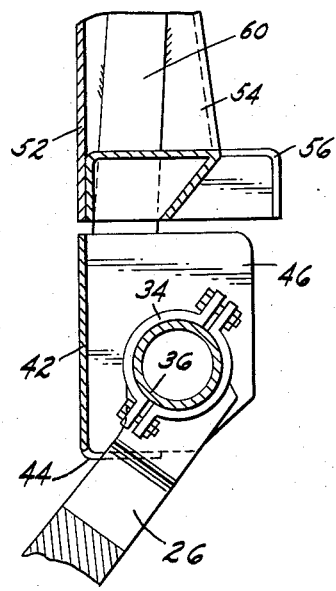
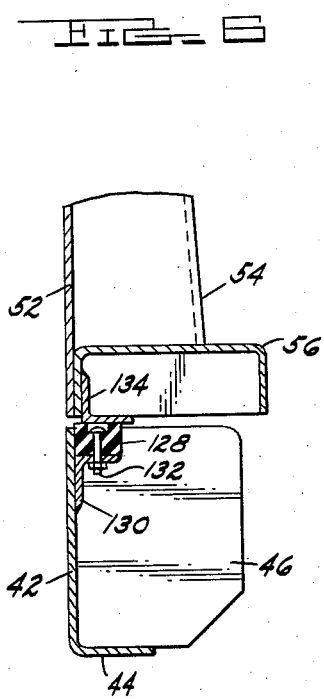
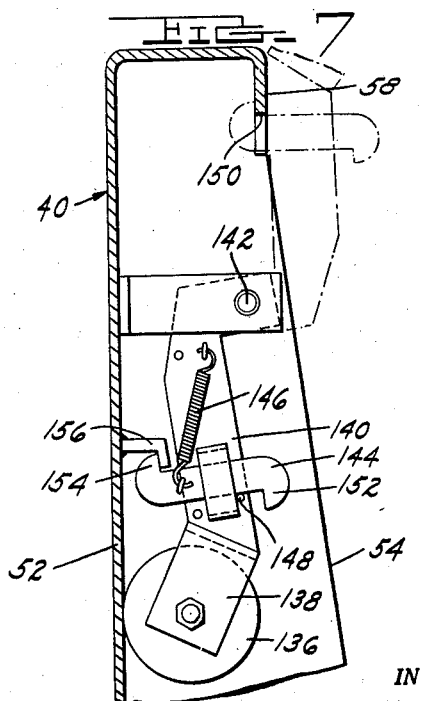
INVENTOR.
EDWARD Y. ROBERTS
BY
ATTORNEYS United States Patent Office 2,850,187
Patented Sept. 2, 1958

2,850,187

TAILGATE MECHANISM FOR TRUCKS

Edward Y. Roberts, Upper Sandusky, Ohio, assignor to Young Spring & Wire Corporation, a corporation of Michigan Application January 17, 1956, Serial No. 559,623

23 Claims. (Cl. 214—77)

This invention relates to power operated loading and unloading apparatus for trucks and more particularly to power operated tailgate mechanisms.

In a mechanism of this type, the tailgate is in the form of a platform that is arranged to be raised and lowered while disposed in a generally horizontal plane between a position substantially on the ground to a position substantially at the level of the truck body platform. Obviously, the tailgate of this type facilitates the loading and unloading of heavy objects. Such tailgate mechanisms are shown, for example, in United States Patent Nos. 2,469,321 and 2,683,540. With such mechanisms, means are provided for pivoting the tailgate when in the elevated position to an out-of-the-way position extending vertically upward.

One of the problems that has arisen in conjunction with trucks provided with such tailgates is that it is often desired to load the truck from a loading platform by means of cargo-handling vehicles such as lift trucks. In order to load a truck provided with a power operated tailgate in this manner, it is necessary to elevate the gate to a position level with the platform of the truck and then back the truck up against the loading dock so that the tailgate forms a short ramp between the loading dock and the platform of the truck. The support and actuating mechanism for the tailgate is usually connected with the tailgate adjacent the inner transverse edge thereof so that the major portion of the tailgate overhangs the supporting structure for the tailgate. Thus, such tailgates are not normally adapted for supporting such tremendous loads as the weight of the cargo-handling vehicle.

It is an object of this invention to provide a power operated tailgate mechanism which is designed so that at least a major portion of the tailgate can be folded downwardly with the tailgate in the elevated position so that a truck equipped with a tailgate of this invention can be backed right up against a loading dock and thereby eliminate the necessity for the overhanging tailgate structure to support the tremendous weight of the cargo-handling vehicle when loaded in this manner.

One embodiment of a tailgate mechanism constructed in accordance with the present invention is shown in the accompanying drawings wherein:

Fig. 1 is a fragmentary side elevational view of the rear portion of a truck equipped with the tailgate of the present invention.

Fig. 2 is a rear elevational view of the tailgate mechanism illustrated in Fig. 1.

Fig. 3 is a sectional view taken along the lines 3—3 in Fig. 2.

Fig. 4 is a sectional view taken along the lines 4—4 in Fig. 2.

Fig. 5 is a fragmentary view showing the tailgate in the down-folded position by solid lines and in the horizontal position by broken lines.

Fig. 6 is a sectional view along the lines 6—6 in Fig. 2.

Fig. 7 is a sectional view along the lines 7—7 in Fig. 2.

Fig. 8 is a sectional view along the lines 8—8 in Fig. 2.

Fig. 9 is a fragmentary view showing the details of the roller mounted on the outer or underside of the tailgate adjacent the outer edge thereof.

Referring first to Figs. 1 and 2 wherein the general arrangement of the tailgate mechanism of this invention is illustrated, the numeral 10 indicates a truck having a body 12 supported on a chassis 14 mounted on wheels 16. The platform of the truck body is indicated at 18 and the tailgate platform is generally designated by the numeral 20. The means for mounting the tailgate on the chassis of the truck includes a pair of transverse depending angles 22 secured to the chassis 14 adjacent the rear end of the truck. Spaced apart brackets 23 provided with bushings 25 are secured to angles 22, and in bushings 25, there is journalled a hollow shaft 24 on which there is fixed a pair of support arms 26. Support arms 26 are arranged to be pivoted upwardly and downwardly by means of a hydraulic system which includes a cylinder 28 in which is arranged a piston, not shown, the rod 30 of which connects with a short arm fixed on shaft 24. The free ends of arms 26 have secured thereto split journal blocks 34 which provide bearings for rotatably supporting a hollow shaft 36.

Tailgate platform 20 is formed in two sections, an inner section 38 and an outer section 40. These two sections, as is shown in Figs. 1 and 2, extend transversely of the truck in generally edge-to-edge relation with the section 38 being considerably smaller in a direction longitudinally of the truck than the section 40. As is shown in Figs. 3 and 4, for example, the tailgate section 38 comprises a plate 42 bent to form a depending flange 44 along the inner or lower edge thereof. Plate 42 is integrally connected with shaft or tube 36 as by plates 46 and 48. There are provided two pairs of plates 46 and two pairs of plates 48 disposed adjacent the opposite ends of the tube 36. One plate in each of the pairs of plates 46 is welded directly to the end of tube 36 as at 50. The plates 48 are provided with openings through which the tube 36 extends, and these plates are welded to the tube around these openings. The outer periphery of plates 46, 48 is shaped to interfit with plate 42 and its depending flange 44 and the members are welded together around these peripheries. Thus, plates 46, plates 48, tube 36 and the tailgate section 38 that is provided by plate 42 in effect form one integral unit.

Tailgate section 40 is in the form of a rectangular panel 52 which is reinforced on its outer or under side by a series of parallel ribs 54 in a direction longitudinally of the trailer and by transversely extending ribs 56 and 58 along the inner and outer transverse edges, respectively, of the platform section. Two of the ribs 54 spaced just inwardly of the journal blocks 34 have brackets 60 welded to opposite sides thereof, and these brackets have split journal blocks 62 secured to the free ends thereof. Journal blocks 62 are rotatably supported on tube 36 as illustrated so that the upper or outer tailgate section 40 is arranged to pivot downwardly about shaft 36 from the full line position shown in Fig. 1 to the position indicated by the broken lines 64. Means described hereinafter are provided for locking the tailgate section 40 in the full line position shown in Fig. 1.

The plates 46 in each pair are spaced apart as shown in Fig. 2; and between each pair of these plates, there is arranged a pair of parallel links or radius rods 66. The upper ends of rods 66 are pivotally connected to the plates 46 by means of pins 68. (See Fig. 6.) The lower ends of rods 66 are pivotally connected as at 70 to the opposite ends of a lever 72 fixed on bushings 74 rotatably supported at the opposite ends of tube 24. Each of the bushings 74 are mounted at opposite ends of a tube 76 within tube 24; and one of the bushings 74, the bushing shown at the left of Fig. 2, has a crank arm 78 fixed thereto. A power cylinder 80 has a piston therein, not shown; and the outer end of the piston rod 82 is pivotally connected to the crank arm 78 as at 84. This mechanism for swinging the tailgate is substantially the same as shown in United States Patent No. 2,683,545.

With the arrangement thus far described, it will be observed that when piston rod 30 is retracted into cylinder 28, tube 24 is rotated in a counterclockwise direction as viewed in Fig. 1 to thereby rotate lift arms 26 and elevate the tailgate 20 from the ground engaging position shown by broken lines 86 to the elevated position shown in full lines in Fig. 1. The radius rods 66 form a parallelogram linkage for maintaining the tailgate 20 in a substantially horizontal position while it is being elevated to the level of the truck platform 18. It will be observed that with the tailgate 20 in the position shown by full lines in Fig. 1, if power is supplied to the cylinder 80 to retract piston rod 82, lever 72 will be rotated in a counterclockwise direction and the rods 66 will pivot the tailgate from the generally horizontal position shown by the solid lines in Fig. 1 to the vertically upwardly extending position designated by the broken lines 88 in Fig. 1.

As pointed out previously, means are provided for maintaining the outer section 40 of the tailgate in a locked position relative to the inner section 38 of the tailgate. These means are illustrated in Figs. 2 and 3. Each of the plates 48 is fashioned with an inclined seat 90 on which is welded a block 92 which spans each set of plates. Within the reinforcing rib 56 at the lower or inner edge of tailgate section 40 there is pivoted, as at 94, a pair of dogs 96, one in alignment with each of the pairs of plates 48. A block or shoe 98 is welded to the outer end of each dog 96. The effective length of dog 96 is adjustable by increasing or decreasing the number of shims 100 positioned between the outer face of shoe 98 and a retaining plate 102. These members are held together by means of a screw 104 threaded into shoe 98. Dog 96 is arranged to be actuated by a toggle mechanism comprising links 106 and 108 pivotally connected together as at 110. Link 106 is pivotally connected to dog 96 as at 112, and link 108 is mounted on an actuating rod 114 which extends transversely through reinforcing ribs 54 on the outer or underside of tailgate section 40. At each end, rod 114 is provided with an operating handle 116 for rotating the rod and thereby pivotally actuating the dogs 96. Stop pins 118 are provided for limiting the movement of handles 116 in the locking direction. A pair of torsion springs 120 (Fig. 2) which surround rod 114 have one end thereof engaged against a lug 112 on the adjacent rib 54 and the other end abutting against a lug 124 fixed on rod 114. Springs 120 normally bias rod 114 in a direction to cause dogs 96 to lock automatically when tailgate section 40 is swung to the raised position. Toggle link 106 is provided with a central turnbuckle portion 126 for adjusting the length of the link. It will be observed that as the toggle swings from the position shown in broken lines in Fig. 3 to the full line position, the pivotal connection 110 swings past center to effectively lock dog 96 against block 92.

With the above locking arrangement, it will be appreciated that to disengage dog 96 from block 92, it is necessary to pivot tailgate section 40 slightly in a counterclockwise direction as viewed in Fig. 3 so that sufficient clearance will be provided to permit the lower edge of plate 102 to swing past block 92. To enable this pivotal movement of tailgate section 40 and nevertheless prevent the two sections 38 and 40 from rattling while the vehicle is traveling, there is arranged at opposite ends of tailgate plate 42 compression blocks 128. These compression blocks, which are preferably formed of die rubber are supported on angles 130 welded to plate 42 by means of bolts 132. An angle 134 is welded within reinforcing rib 56 at each end thereof to contact the upper or outer face of block 128 when the tailgate section 40 is pivoted upwardly relative to tailgate section 38. In the locked position of dog 96, the rubber blocks 128 are slightly compressed and thus prevent the tailgate section 40 from rattling. When it is desired to release dogs 96, tailgate section 40 is pivoted upwardly a slight amount to further compress block 128 and provide necessary clearance to enable plate 102 to swing upwardly free of block 92.

In the case of a large tailgate, the section 40 may be relatively heavy; and therefore, means are provided for automatically pivoting the section 40 upwardly when the tailgate is lowered to the ground engaging position so that the dogs may be readily released by turning either of the handles 116. These means are in the form of a roller 136 journalled between the legs of a yoke 138 welded to an arm 140. Arm 140 is pivotally connected as at 142 to the outer or underside of tailgate section 40 adjacent the outer edge of the tailgate. A detent 144 is pivoted on arm 140, and a spring 146 urges detent 144 into engagement with a stop pin 148. The outer reinforcing rib 58 is provided with a notch 150 with which the hook end 152 of detent 144 is arranged to engage when the arm 140 is pivoted to the position shown by solid lines in Fig. 1. A lug 154 on the underside of tailgate section 40 is arranged to be engaged by the hooked end 156 of detent 144 when arm 140 is pivoted to the nested position shown in Fig. 9. When it is desired to fold tailgate section 40 to the depending position indicated by the broken lines 64 in Fig. 1, arm 140 is swung downwardly and outwardly to engage detent 144 in notch 150. The tailgate is then lowered; and when roller 136 engages the ground surface, the section 40 is pivoted upwardly a sufficient amount to enable either of the handles 116 to be swung freely in a clockwise position as viewed in Fig. 1 to release the dogs 96 from the blocks 92. Thereafter, power cylinder 28 is actuated to rotate the lift arms 26 upwardly and tailgate section 40 assumes the position indicated by the broken lines 64 in Fig. 1. In this position of tailgate section 40, it will be noted that the truck can be backed right up against a loading dock so that the truck can be loaded by means of a vehicle such as a lift truck. The tailgate section 38 is disposed directly above the tube 36 and thus does not subject the tube 36 to a considerable torque when subjected to a vertical load as is the case when the tailgate section 40 is subjected to vertical loading.

I claim:

1. A tailgate assembly for a truck comprising a support adapted to be mounted on the truck chassis, a tailgate platform, lifting means on said support connected with said platform adjacent the inner transverse edge thereof and arranged when actuated to raise the platform from a ground engaging position to a position substantially level with the truck body, means pivotally mounting said platform on said lifting means for pivotal movement about said inner transverse edge from a horizontal position to a position extending vertically upwardly, said tailgate being divided transversely throughout its width into a relatively narrow portion and a relatively wide portion, said relatively wide portion of said tailgate being pivotal relative to said narrow portion about an axis adjacent said inner transverse edge when the tailgate is in the elevated position from a horizontal position to a vertically downwardly depending position, said lifting means being connected with said narrow portion.

2. A tailgate assembly as called for in claim 1 wherein said lifting means comprise a pair of lift arms pivotally mounted on said support.

3. A tailgate assembly as called for in claim 1 wherein the axis about which the platform is pivotable to a vertically upwardly extending position coincides with the axis about which said wider portion of the platform is pivotable to a vertically downwardly depending position.

4. A tailgate assembly as called for in claim 1 including a shaft fixed on said platform adjacent said inner transverse edge thereof, said shaft being supported for rotation at the outer ends of said lift arms and hinge members supporting said wider portion of the platform journalled for pivotal movement on said shaft.

5. A tailgate assembly for a truck comprising a support adapted to be mounted on the truck, a pair of lift arms mounted on said support for pivotal movement to and from raised and lowered positions, a tailgate platform, means mounting said tailgate platform at the free ends of said lift arms, means for pivoting said platform about its connection with said arms whereby when said arms are pivoted to said raised position, said platform can be pivoted into either a horizontal position or a vertically upwardly extending position, said platform being divided transversely throughout its width into two portions, one of said portions being connected with said pivot means at the free ends of said lift arms and the other portion being supported for pivotal movement relative to said one portion from a horizontal position to a vertically downwardly extending position about an axis substantially parallel to and positioned closely adjacent to the pivotal axis of said first mentioned portion.

6. A tailgate assembly as called for in claim 5 wherein the dimension of said first portion of the platform in a direction transversely of said pivotal axis is substantially less than the corresponding dimension of said second portion of the platform.

7. A tailgate assembly as called for in claim 5 wherein said pivotal axis of said second portion is spaced inwardly of said dividing line towards said first pivotal axis whereby said second portion can be pivoted to a position underlying said first portion of the platform.

8. A tailgate assembly as called for in claim 7 including means for releasably locking said second portion of the platform against pivotal movement relative to said first portion when said two portions are aligned in generally the same plane.

9. A tailgate assembly as called for in claim 8 wherein said locking means comprise a dog pivoted on one portion of the platform and engageable with an abutment on the other portion of the platform.

10. A tailgate assembly for a truck comprising a support adapted to be mounted on the truck chassis, a pair of lift arms pivoted on said support, a shaft journalled for rotation at the free ends of said arms between raised and lowered positions, a tailgate platform supported on said shaft such that when the arms are pivoted from said lowered to said raised position, said platform is elevated from a position on the ground to a position generally level with the body of the truck, means connected with said platform for maintaining the platform in a generally horizontally disposed position and for pivoting the platform about the axis of said shaft from said horizontal position to a position extending vertically upwardly, said platform being divided throughout its width along a transverse line adjacent said shaft into two portions, the portion adjacent said shaft being substantially narrower than the portion more remote from said shaft and being fixed on said shaft, said second mentioned portion of the platform being supported to pivot from said horizontal position downwardly relative to said first portion to a vertically downwardly depending position.

11. A tailgate assembly as called for in claim 10 wherein the pivotal axis of the downwardly swingable portion of the platform is disposed adjacent said first line of division between said two portions of the platform.

12. A tailgate assembly as called for in claim 10 wherein the pivotal axis of the downwardly swingable portion of the platform comprises the axis of said shaft.

13. A tailgate assembly as called for in claim 10 including a pair of brackets fixed on said second portion of the platform and pivotally supported on said shaft.

14. A tailgate assembly as called for in claim 10 including a pair of brackets fixed on said second portion of the platform and rotatably journalled on said shaft.

15. A tailgate assembly as called for in claim 14 wherein said brackets and said lift arms are journalled on said shaft in closely spaced relation.

16. A tailgate assembly for a truck comprising a support adapted to be mounted on the truck chassis, a pair of lift arms pivoted on said support, a shaft journalled for rotation at the free ends of said arms between raised and lowered positions, a tailgate platform supported on said shaft such that when the arms are pivoted from said lowered to said raised position, said platform is elevated from a position on the ground to a position generally level with the body of the truck, means connected with said platform for maintaining the platform in a generally horizontally disposed position and for pivoting the platform about the axis of said shaft from said horizontal position to a position extending vertically upwardly, said platform being divided along a transverse line adjacent said shaft into two portions, the portion of said platform adjacent said shaft being fixed on said shaft and the portion more remote from said shaft being pivotally supported on said shaft for swinging movement from said horizontal position downwardly to a vertical position, and means for locking said second portion of the platform in said horizontal position.

17. A tailgate assembly as called for in claim 16 wherein said locking means comprise a dog pivoted on one of said portions and engageable with an abutment fixably supported relative to the other portion of the platform.

18. A tailgate assembly as called for in claim 16 wherein said locking means comprise a dog pivoted on said second portion of the platform and engageable with an abutment fixed on said shaft, said dog extending downwardly from said second portion of the platform towards the first portion in the general direction of the downwardly pivoting movement of said second portion, whereby when in locking position, said dog is subjected to compressive stresses.

19. A tailgate assembly as called for in claim 18 wherein at least two of said dogs are provided, one closely adjacent each of said lift arms.

20. A tailgate assembly as called for in claim 18 including a compression member positioned between said two portions of the platform, said compression member providing a resilient stop for yieldably limiting the upward pivotal movement of said second portion of the platform relative to said first portion.

21. A tailgate assembly as called for in claim 20 including a movable abutment on the outer or underside of said second portion of the platform adjacent the outer transverse edge thereof, said abutment being shiftable from a retracted position generally within the confines of the platform to a position projecting outwardly or downwardly from the plane of the platform wherein it engages the ground surface when the platform is lowered to compress said compression member and thereby permit pivoting of said dog to a position free of said abutment.

22. A tailgate assembly as called for in claim 18 including a toggle mechanism on said second portion of the platform connected with said dog and movable in opposite directions over center to lock and release said dog.

23. A tailgate assembly as called for in claim 22 wherein said toggle mechanism includes a pair of pivotally connected links, one of said links being adjustable in length to vary the effective length of said toggle.

References Cited in the file of this patent

UNITED STATES PATENTS

| | | |
|---|---|---|
| 1,125,982 | Dufala | Jan. 26, 1915 |
| 1,297,164 | Hickey et al. | Mar. 11, 1919 |
| 2,260,099 | Chenoweth | Oct. 21, 1941 |
| 2,683,539 | Corley | July 13, 1954 |
| 2,719,637 | Wood | Oct. 4, 1955 |
| 2,725,152 | Gwinn | Nov. 29, 1955 |